United States Patent [19]

Hayakawa et al.

[11] Patent Number: 5,300,314
[45] Date of Patent: Apr. 5, 1994

[54] PROCESS FOR PREPARING A MAGNETIC RECORDING MEDIUM

[75] Inventors: Satoru Hayakawa; Kazuhiro Niitsuma; Toshio Kawamata, all of Kanagawa, Japan

[73] Assignee: Fuji Photo Film Co., Ltd., Kanagawa, Japan

[21] Appl. No.: 993,616

[22] Filed: Dec. 21, 1992

[30] Foreign Application Priority Data

Dec. 19, 1991 [JP] Japan .................................. 3-337161

[51] Int. Cl.$^5$ ............................................. H01F 10/02
[52] U.S. Cl. ..................................... 427/58; 427/130; 427/131; 427/132
[58] Field of Search ................... 427/58, 130, 131, 132

[56] References Cited

U.S. PATENT DOCUMENTS 4,963,433 10/1990 Ogawa et al. ........................ 428/323

Primary Examiner—Bernard Pianalto
Attorney, Agent, or Firm—Sughrue, Mion, Zinn, Macpeak & Seas

[57] ABSTRACT

The present invention relates to a magnetic recording medium comprising, in the following order:
(a) a nonmagnetic support;
(b) a nonmagnetic layer comprising nonmagnetic particles and a binder resin; and
(c) a magnetic layer comprising ferromagnetic particles and a binder resin;

wherein said magnetic layer has a thickness of 0.8 μm or less and said nonmagnetic layer and said magnetic layer are formed by a process which comprises the steps of coating a nonmagnetic layer coating solution on said nonmagnetic support, and then subsequently coating a magnetic layer coating solution on said nonmagnetic layer coating solution wile said nonmagnetic layer is wet and, further, wherein the solvent used in said nonmagnetic layer coating solution has a higher boiling point than the solvent used in said magnetic layer coating solution.

Further, the present invention relates to a process for preparing a magnetic recording medium, which comprises the steps of:
(a) coating a nonmagnetic layer coating solution comprising nonmagnetic particles dispersed in a binder resin solution on a nonmagnetic support to form a nonmagnetic coating layer,
(b) coating a magnetic layer coating solution comprising ferromagnetic particles dispersed in a binder resin solution on said nonmagnetic coating layer while said nonmagnetic coating layer is wet, and
(c) drying to form a nonmagnetic layer and a magnetic layer on said nonmagnetic support;

wherein the boiling point of the solvent used for said nonmagnetic layer coating solution is higher than the boiling point of the solvent used in said magnetic layer coating solution.

10 Claims, No Drawings

PROCESS FOR PREPARING A MAGNETIC RECORDING MEDIUM

FIELD OF THE INVENTION

The present invention relates to a magnetic recording medium for high density recording. More particularly, the present invention relates to an improved magnetic recording medium comprising a coating type thin magnetic layer and an improved process for preparing the same.

BACKGROUND OF THE INVENTION

The magnetic recording technique has been widely utilized in various fields, such as video equipment, audio equipment and computers, because of its excellent advantages (which are not seen in other recording systems), that is, it enables repeated use of media, it can easily use a signal in an electronic form, enabling the configuration of a system combined with peripherals, and it can modify a signal. In order to cope with the tendency toward miniaturization of equipment, the demand for improvement in the quality of recorded and reproduced signals, the demand for prolongation of recordable time and the demand for increase in the recording capacity, it has been desired to further improve the recording capacity of recording media.

To this end, improvements in magnetic materials have been made to improve the surface properties of the magnetic layer, the dispersibility of magnetic particles in the magnetic layer and the magnetic properties of the magnetic layer.

In audio and video applications, in order to provide a digital recording system having improved sound quality and picture quality as well as a video recording system adapted for high fidelity TV, magnetic recording media enabling the recording and reproduction of short wave signals have been required more than in the conventional systems.

Further, floppy discs having a magnetic layer on a flexible nonmagnetic support as external recording media for microcomputers and personal computers have been required to have a high capacity (as high as 10 M bytes or more) in order to cope with the recent spread of personal computers, the trend toward the improvement in application software, and the increase in the amount of data to be processed.

A recording system for high density code having a frequency component region 1.5 times wider than that of conventional codes, such as RLL signal, has been proposed for floppy discs. Thus, the shortest recordable wavelength of signals to be recorded on these floppy discs is coming close to 3.0 μm or less, even 1.5 μm or less.

In order to enhance the recording density of the system, the gap length of magnetic heads, too, has been, of course, reduced, nearing 0.5 μm or less.

As a medium enabling a high density recording with the small shortest recordable wavelength, there has been proposed a so-called thin metal film type magnetic recording medium comprising a thin ferromagnetic metal film as a magnetic layer which has been recently put into practical use for 8-mm application.

However, the thin metal film type magnetic recording medium has many disadvantages in durability, running properties and corrosion resistance. Since such a magnetic recording medium has to cope with these problems, it cannot sufficiently provide its inherently excellent electromagnetic characteristics.

In the coating type magnetic recording medium comprising a magnetic layer mainly composed of ferromagnetic particles and a binder resin, it is necessary to reduce the size of ferromagnetic particles to be used or enhance the coercive force of the magnetic layer to provide a high density recording. As such an approach, there has been proposed the use of ferromagnetic metal powder as ferromagnetic particles in the magnetic layer particularly from the standpoint of coercive force in JP-A-58-122623 and JP-A-61-74137 (the term "JP-A", as used herein, means an "unexamined published Japanese patent application").

JP-B-62-49656 and JP-B-60-50323 (the term "JP-B", as used herein, means an "examined Japanese patent publication"), and U.S. Pat. Nos. 4,629,653, 4,666,770 and 4,543,198 disclose that as ferromagnetic particles there are used hexagonal system ferrites such as barium ferrite.

In a magnetic recording medium for computers (such as floppy discs), overwriting of signals having different recording frequencies is indispensable. The conventional media were enough if they allowed overwriting of two kinds of signals in a double-frequency relationship, i.e., 1f and 2f signals. However, the above mentioned RLL signal system requires not only the reduction of recordable wavelength but also overwriting of a plurality of signals having a frequency ratio of 3:8.

In the case where signals having a short recording wavelength and a great difference in recording frequency are thus used, overwriting of a signal with a shorter recording wavelength on a signal with a longer recording wavelength cannot be successfully performed if the magnetic properties of the magnetic layer are merely improved as disclosed in the above cited JP-A-58-122623 and JP-A-61-74137.

In other words, even when a signal with a shorter recording wavelength is overwritten on a previously recorded signal with a longer recording wavelength, the magnetic line of force doesn't reach deep in the magnetic layer and thus cannot erase the previously recorded signal with a longer wavelength.

In order to overcome this difficulty, it is most effective to reduce the thickness of the magnetic layer.

Also in video application, the reduction of the thickness of the magnetic layer is extremely favorable for the reduction of loss due to thickness or self-demagnetization loss and, hence, the enhancement of the electromagnetic characteristics.

If a magnetic layer is coated in a thin single layer, it is extremely unfavorable for the enhancement of the surface properties of the magnetic layer. In particular, when the thickness of the magnetic layer falls 1.0 μm or less, it is difficult to obtain a magnetic layer having excellent surface properties on a nonmagnetic support in the form of a single layer.

Another problem associated with these magnetic recording media is electrification of the media. In other words, the occurrence of dropout due to the attachment of dust to the surface of the magnetic layer caused by the electrification of the media must be inhibited. In particular, in video tapes for use in digital video and magnetic recording discs which provide digital recording of computer data, the lack of recorded or reproduced signals due to dropout causes an increase in B.E.R. (bit error rate) giving a fatal problem.

The shorter the recording wavelength of signals to be recorded in these magnetic recording discs is, the greater is the effect of dropout on the magnetic layer. Thus, this electrification problem is a serious problem in the design of a magnetic recording disc having a large capacity and a high recording density.

An ordinary method of inhibiting the electrification of media is to incorporate carbon black in the magnetic layer. However, even if the thickness of the magnetic layer is reduced (taking into account the above mentioned problem caused by overwriting in recording of a short recording wavelength region), the amount of carbon black to be retained in the magnetic layer is limited. Further, in order to maintain the excellent magnetic properties, the incorporation of carbon black in the magnetic layer is preferably avoided as much as possible.

As another means of solving the electrification problem, there has been proposed a magnetic recording medium comprising a nonmagnetic layer containing carbon black or the like provided interposed between a magnetic layer and a nonmagnetic support. This magnetic recording medium is disclosed in, e.g., JP-A-55-55432, JP-A-50-104003, JP-A-62-214513, JP-A-62-214514, JP-A-62-231417, and JP-A-63-31027, and U.S. Pat. No. 3,440,091. The magnetic recording medium having such a layer construction is proposed also for the purpose of improving the surface properties or running durability of the magnetic layer.

However, the thickness of the magnetic recording media disclosed in the background art techniques is not sufficiently thin for short wavelength recording and high capacity media which are currently required.

When the thickness of the magnetic layer is reduced to improve the overwritability of magnetic recording discs, the amount of a lubricant which can be retained by the magnetic layer is reduced, deteriorating the running durability. In other words, after repeated sliding movement of the magnetic layer relative to the magnetic head, lubricant runs short, causing a rise in the friction coefficient thereof. As a result, the magnetic head will scratch the magnetic layer. If the magnetic layer contains too much lubricant, the physical properties thereof are deteriorated. Thus, the content of the lubricant in the magnetic layer is naturally limited.

If a ferromagnetic metallic powder or hexagonal system ferrite is used as ferromagnetic particles to be incorporated in the magnetic layer (as mentioned above) to increase the recording density and capacity of magnetic recording media, the magnetic layer tends to exhibit a deteriorated running durability.

Thus, a magnetic recording medium comprising a thin magnetic layer as an uppermost layer laminated on a nonmagnetic layer and a nonmagnetic support has been desired.

On the other hand, the thinner the magnetic layer is, the easier the magnetic layer can be peeled. The magnetic layer thus peeled off can be another cause of dropout. This problem, too, must be coped with. The peeling of the magnetic layer cannot be avoided even by providing a nonmagnetic layer between the magnetic layer and the nonmagnetic support. This problem occurs particularly in the case of the so-called successive multilayer coating method which comprises coating a layer, drying the layer, and subsequently coating another layer.

This problem is considerably eliminated by using the wet-on-wet coating method as disclosed in JP-A-63-191315 (corresponding to U.S. Pat. No. 4,963,433) to coat a magnetic layer coating solution while a nonmagnetic layer (which has been coated on a nonmagnetic support) is wet.

However, in the wet simultaneous coating method, if the viscoelasticity of the underlayer coating solution is not close to that of the upper layer coating solution, the resulting magnetic layer is subject to linear coating marks or rough surface possibly because of irregular solution streams developed at the interface between the two layers, making it impossible to obtain a magnetic layer with excellent surface properties. In particular, the nonmagnetic layer coating solution and the magnetic layer coating solution differ from each other in the properties of particles dispersed therein and can hardly coincide with each other in viscoelasticity.

As mentioned above, in order to obtain a large capacity magnetic recording medium comprising a thin magnetic layer which provides a high density recording and exhibits excellent durability and running properties, the above mentioned various problems must be coped with. No means satisfying all these requirements have been proposed yet.

SUMMARY OF THE INVENTION

An object of the present invention is to provide a magnetic recording medium having excellent electromagnetic properties and running durability, and a process for preparing the magnetic recording medium.

In particular, it is an object of the present invention to provide a magnetic recording disc having an excellent overwritability in high density recording and a high recording capacity, and a process for the preparation thereof.

These and other objects of the present invention will become more apparent from the following detailed description and examples.

These objects of the present invention are accomplished with a magnetic recording medium comprising, on a nonmagnetic support, a nonmagnetic layer mainly comprising nonmagnetic particles and a binder resin, and a magnetic layer mainly comprising ferromagnetic particles and a binder resin in this order, wherein the thickness of the magnetic layer is 0.8 $\mu$m or less, the nonmagnetic layer and magnetic layer are formed by a process which comprises coating a nonmagnetic layer coating solution on the nonmagnetic support, and then coating a magnetic layer coating solution thereon while the nonmagnetic coating layer is wet, and the boiling point of the solvent used for said nonmagnetic layer coating solution is higher than that of the solvent used for said magnetic layer coating solution.

These objects of the present invention are also accomplished by a process for preparing a magnetic recording medium which comprises coating on a nonmagnetic support a nonmagnetic layer coating solution comprising nonmagnetic particles dispersed in a binder resin solution to form a nonmagnetic coating layer, coating on the nonmagnetic coating layer a magnetic layer coating solution comprising ferromagnetic particles dispersed in a binder resin solution and a solvent having a boiling point lower than that of the solvent used for the nonmagnetic layer coating solution while the nonmagnetic coating layer is wet, and then drying the material to form a nonmagnetic layer and a magnetic layer on the nonmagnetic support in this order.

DETAILED DESCRIPTION OF THE INVENTION

In the magnetic recording medium of the present invention, the thickness of the magnetic layer is as small as 0.8 μm or less, causing no loss even if the shortest recordable wavelength is small and providing an excellent overwritability indispensable for digital data recording.

Since the present invention uses a process which comprises coating on a nonmagnetic support a nonmagnetic layer coating solution to form a nonmagnetic coating layer thereon, and then coating on the nonmagnetic coating layer a magnetic layer coating solution while the nonmagnetic coating layer is wet to provide a magnetic layer having a good adhesion to the nonmagnetic layer, a magnetic recording medium can be obtained which exhibits an excellent running durability and a high reliability and which has a magnetic layer having a thickness as small as 0.8 μm or less and is hardly subjected to peeling.

Further, by predetermining the boiling point of the solvent used for the nonmagnetic layer coating solution (higher than that of the solvent used for the magnetic layer coating solution), coating solutions greatly differing from each other in viscoelasticity can be coated in a wet simultaneous multi-layer coating process to obtain a magnetic layer having an extremely small final dry coating thickness of 0.8 μm or less and which is free from coating lines or rough surfaces. Thus, a magnetic recording medium can be obtained which provides a high reproduced output and exhibits an excellent running durability and an excellent overwritability when used as a magnetic recording disc. This may be because the use of a solvent having a higher boiling point in the nonmagnetic layer coating solution than of the solvent used for the magnetic layer coating solution prevents the evaporation of the solvent from the nonmagnetic layer thus coated, inhibiting the deformation of the surface of the nonmagnetic layer for a short period of time until the magnetic layer coating solution has been coated thereon, and that the use of such a solvent prevents the turbulence of the solution at its interface with the magnetic layer coating solution having a different viscoelasticity when brought into contact with the magnetic layer coating solution while the nonmagnetic layer is wet, inhibiting the development of roughening and coating lines on the magnetic layer.

Further, the use of such a solvent inhibits the turbulence of the solution at the interface of the wet nonmagnetic layer with the magnetic layer coating solution, giving a magnetic layer having a uniform thickness that provides a magnetic recording medium with little output fluctuations.

Moreover, by predetermining the boiling point of the solvent used for the nonmagnetic layer coating solution preferably 40° C., more preferably 50° C. higher than that of the solvent used for the magnetic layer coating solution, the objects of the present invention can be more effectively accomplished.

Further, the boiling point of the solvent used for the nonmagnetic layer coating solution is preferably in the range of 90° C. or higher, more preferably 100° C. or higher. The boiling point of the solvent used for the magnetic layer coating solution is preferably in the range of preferably 100° C. or lower, more preferably 90° C. or lower, most preferably 80° C. or lower.

In the magnetic recording medium of the present invention, if the boiling point of the nonmagnetic layer coating solution is too low, it disadvantageously causes coating lines or roughening on the surface of the magnetic layer formed on the nonmagnetic layer, reducing the reproduced output or deteriorating the running durability.

On the contrary, if the boiling point of the nonmagnetic layer coating solution is too high, the amount of the solvent left in the layer is too great, disadvantageously deteriorating the film properties of the magnetic layer and hence the running durability when used as a magnetic recording medium. Further, this makes the difference in evaporation rate from the magnetic layer coating solution too large, roughening the magnetic layer easily. Thus, the boiling point of the solvent used for the nonmagnetic layer coating solution is preferably not higher than 200° C.

The thickness of the magnetic layer in the magnetic recording medium of the present invention is in the range of 0.8 μm or less, preferably 0.05 μm to 0.6 μm, more preferably 0.1 μm to 0.5 μm. If the thickness of the magnetic layer is too large, the output loss is too large to expect a high reproduced output in the short recording wavelength range. Further, the overwritability required for digital data recording is deteriorated, particularly when the recording wavelength is in the range of 1.5 μm or less.

The thickness of the magnetic layer has no specific lower limit. However, if the thickness of the magnetic layer is too small, it disadvantageously gives a reduced reproduced output.

The sum of the thickness of the nonmagnetic layer and the magnetic layer formed on the nonmagnetic support may be in the range of 1 μm to 10.0 μm.

The thickness of the nonmagnetic layer is in the range of preferably 0.5 μm to 5 μm, more preferably 0.5 to 4 μm, most preferably 0.5 to 3 μm. If the thickness of the nonmagnetic layer is too small, the surface properties of the magnetic layer formed thereon cannot be sufficiently enhanced. If electrically conductive particles are used as nonmagnetic particles, a sufficient antistatic effect cannot be expected. On the contrary, if the thickness of the nonmagnetic layer is too large, the magnetic recording medium disadvantageously makes a poor contact with the magnetic head.

By using a ferromagnetic powder or hexagonal system ferrite as ferromagnetic particles to be incorporated in the magnetic layer in the magnetic recording medium of the present invention, a magnetic layer can be obtained which provides excellent electromagnetic characteristics and a high output even when its thickness is extremely small as 0.8 μm or less.

When ferromagnetic metallic particles are incorporated in the magnetic layer in the magnetic recording medium of the present invention, the acicular ratio of the ferromagnetic metallic particles is preferably in the range of 3 to 12, and the coercive force of the magnetic layer is preferably in the range of 1,400 Oe or more. On the other hand, if hexagonal system ferrites are used, they preferably have an average particle diameter of 0.01 to 0.2 μm and a tabular ratio of 3 to 20 and the ferromagnetic particles thereof preferably exhibit a perpendicular diamagnetic field-corrected squareness ratio of 0.6 or more in the magnetic layer.

By so adjusting the ferromagnetic particles in the magnetic layer, a high density recording with excellent electromagnetic properties can be provided, and a magnetic layer with a high orientation ratio, i.e., small circumferential deviation of squareness ratio of ferromagnetic particles and small output fluctuations can be obtained.

By incorporating electrically conductive particles such as carbon black in the nonmagnetic particles in the nonmagnetic layer, a magnetic recording medium can be obtained which can be hardly charged, causes little dropout and exhibits an excellent running durability.

In the preparation of the magnetic recording medium of the present invention, the coating of the magnetic layer on the nonmagnetic layer can be carried out by the so-called wet-on-wet coating method. That is, the magnetic layer coating solution may be coated on the nonmagnetic layer coating solution (coated on the nonmagnetic support) while the nonmagnetic layer coating solution is wet. By employing this coating method, the adhesion of the magnetic layer to the nonmagnetic layer can be enhanced, giving a magnetic recording disc which is insusceptible to peeling, shows no dropout and exhibits an excellent running durability even if the magnetic layer is as thin as 0.8 $\mu$m or less.

In accordance with the conventional coating method which comprises coating a nonmagnetic layer coating solution on a support, drying the material to form a nonmagnetic layer thereon, and then coating a magnetic layer (coating solution) on the nonmagnetic layer, the resulting magnetic layer is extremely thin. Accordingly, in the case of the conventional magnetic recording disc the adhesion between the nonmagnetic layer and the magnetic layer is not sufficient, making it difficult to provide an integrated structure of the two layers formed on the nonmagnetic support.

Specific examples of the above mentioned wet-on-wet coating method include the following methods:

(1) A method which comprises coating a lower layer by means of a gravure coating apparatus, roll coating apparatus, blade coating apparatus or extrusion coating apparatus commonly used for magnetic coating, and then coating an upper layer on the lower layer by means of a nonmagnetic support pressure type extrusion coating apparatus disclosed in JP-B-1-46186, and JP-A-60-238179 and JP-A-2-265672 while the lower layer is wet;

(2) A method which comprises coating the lower layer coating solution and the upper layer coating solution almost simultaneously by means of a coating head incorporating two coating solution passage slits as disclosed in JP-A-63-88080, JP-A-2-17971, and JP-A-2-265672; and (3) A method which comprises coating the lower layer coating solution and the upper layer coating solution almost simultaneously by means of an extrusion coating apparatus with a back-up roll as disclosed in JP-A-2-174965.

In order to inhibit the aggregation of particles dispersed in the coating solution, a method as disclosed in JP-A-62-95174 and JP-A-1-236968 can be used to provide the coating solution inside the coating head with a shearing force.

In the wet-on-wet coating method, the viscoelasticity (thixotropy) of the coating solution should be addressed. In other words, if the difference in the viscoelasticity between the upper layer coating solution and the lower layer coating solution is great, mixing of solutions occurs at the interface of the upper layer with the lower layer, causing some problems such as deterioration of the surface properties if the thickness of the upper magnetic layer is very small as in the present invention.

In order to render the viscoelasticity of the two coating solutions as close to each other as possible, it is effective to use the same particles in the upper layer and the lower layer. This approach is possible with the present invention. In order to meet the structural viscosity given by the structure in which magnetic particles are formed by magnetism in the magnetic layer coating solution, particles which can easily produce a structural viscosity such as carbon black are preferably used as nonmagnetic particles to be incorporated in the lower nonmagnetic layer coating solution. To this end, it is effective to use carbon black having a high oil absorption and a small particle size. It is also effective to use nonmagnetic particles having a small particle size other than carbon black. For example, particles of titanium oxide, aluminum oxide or the like can be subjected to proper aggregation to easily provide a coating solution having a structural viscosity of particles.

The ferromagnetic particles to be incorporated in the magnetic layer in the magnetic recording medium of the present invention are not specifically limited. For example, oxide series magnetic materials such as chromium oxide, cobalt-clad iron oxide and $\gamma$-iron oxide, ferromagnetic metal powders, and hexagonal system ferrites can be used. In order to accomplish the objects of the present invention (e.g., to provide a magnetic recording medium for high density recording), ferromagnetic powders or hexagonal system ferrites are preferably used as mentioned above. Particularly preferably, the hexagonal system ferrites are used.

The water content of the magnetic particles to be used in the present invention is preferably in the range of 0.01 to 2% by weight. The water content of the magnetic particles needs to be optimized depending on the kind of binder resin to be used in combination therewith.

The pH value of the magnetic particles to be used in the present invention is preferably optimized depending on the combination with the binder resin used. The pH value of the magnetic particles is preferably in the range of 4 to 12, more preferably 6 to 10. In particular, when the molecule of the binder resin contains a polar group, attention is preferably paid to the pH value of the magnetic particles.

The magnetic particles to be used in the present invention may be subjected to surface treatment with aluminum, silicon, phosphorus or an oxide thereof if desired. The amount of the material to be used for this surface treatment is in the range of 0.1 to 10% based on the weight of the magnetic particles. When subjected to surface treatment, the magnetic particles exhibit an adsorption of lubricant such as aliphatic acid of 100 mg/m$^2$ or less, advantageously increasing the amount of free lubricant in the magnetic layer. Ferromagnetic particles may contain soluble inorganic ions such as sodium, calcium, iron, nickel and strontium ions. However, if the concentration of such an inorganic ion is not more than 500 ppm, it gives no adverse effects to the properties of the ferromagnetic particles.

These ferromagnetic particles may contain atoms other than their predetermined atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B.

The measurement of saturation magnetization and coercive force are carried out by means of VSM-PI (manufactured by Toei Kogyo K.K.) under a maximum magnetic field of 10 KOe. The measurement of specific surface area is carried out by means of Quantasorb (manufactured by Quantachrome Co. of U.S.). For measurement, the specimen is dehydrated at a temperature of 250° C. for 30 minutes in a nitrogen atmosphere. The measurement is effected by BET single point method at a partial pressure of 0.30.

The acicular ratio of the ferromagnetic metallic particles to be used in the present invention is in the range of 3 to 12, preferably 4 to 11, more preferably 6 to 10. If the acicular ratio is too high, the orientation ratio cannot be increased as desired. On the contrary, if the acicular ratio is too low, the ferromagnetic metallic particles are easily subject to pressure demagnetization.

In order to provide a high recording density, if ferromagnetic metallic particles are used as ferromagnetic particles, the coercive force of the magnetic layer is preferably adjusted to 1,400 Oe or more, more preferably 1,500 Oe or more.

If the coercive force of the magnetic layer is too low, the resulting self-demagnetization effect disadvantageously causes a drop in the signal output. On the contrary, if the coercive force of the magnetic layer is too high, the diamagnetization by the magnetic recording head is made difficult. Therefore, the ferromagnetic particles are preferably selected such that the coercive force of the magnetic layer is preferably not more than 2,500 Oe.

The residual magnetic flux density is preferably in the range of 1,100 G or more, more preferably 1,400 G or more.

The size of the magnetic particles to be used in the present invention is normally in the range of 25 to 80 $m^2/g$, preferably 35 to 60 $m^2/g$ as calculated in terms of specific surface area by BET method. If the particle size falls below 25 $m^2/g$, the noise level rises. On the contrary, if the particle size exceeds 80 $m^2/g$, the dispersion of the magnetic particles is made difficult, making it impossible to provide the magnetic layer with good surface properties. As calculated in terms of crystalline size determined by X-ray diffractometry, the size of the magnetic particles to be used in the present invention is normally in the range of 450 to 100 Å, preferably 350 to 150 Å.

The above mentioned ferromagnetic metallic particles to be used in the present invention may comprise a small amount of a hydroxide or oxide. As the ferromagnetic metallic particles, there can be used those obtained by known preparation methods. Examples of these preparation methods include a method which comprises the reduction with a composite organic acid salt (mainly oxalate) and a reducing gas such as hydrogen, a method which comprises the reduction of iron oxide with a reducing gas such as hydrogen to obtain Fe or Fe-Co particles, a method which comprises the thermal decomposition of a metallic carbonyl compound, a method which comprises adding a reducing agent such as sodium borohydride, hypophosphite and hydrazine to an aqueous solution of a ferromagnetic metal so that the ferromagnetic metal is reduced, and a method which comprises the evaporation of a metal in an inert gas under reduced pressure to obtain a finely divided metallic powder.

Before use, the ferromagnetic metallic particles thus obtained may be subjected to any known gradual-oxidizing treatment. Examples of such a gradual-oxidizing treatment include a method which comprises dipping the ferromagnetic particles in an organic solvent, and then drying the material, a method which comprises dipping the ferromagnetic particles in an organic solvent, supplying an oxygen-containing gas into the system to form an oxide layer thereon, and then drying the material, and a method which comprises adjusting the partial pressure of oxygen gas and inert gas in a system free of organic solvent to form an oxide layer on the ferromagnetic particles. The ferromagnetic particles to be used preferably have a porosity of 20% by volume or less, more preferably 5% by volume or less.

As hexagonal system ferrite which can be used as the ferromagnetic particles to be incorporated in the magnetic layer of the magnetic recording disc of the present invention, typically, there can be selected tabular ferromagnetic particles having axis of easy magnetization in the direction vatical of the plane. Examples of the composition of hexagonal system ferrites include substituted barium ferrite, substituted strontium ferrite, substituted lead ferrite, substituted calcium ferrite, cobalt-substituted barium, and barium, strontium, lead or calcium ferrite. Specific examples of such compositions include magnetoplumbite type barium ferrite, magnetoplumbite type strontium ferrite, and magnetoplumbite type barium and strontium ferrites partially comprising a spinel phase. Particularly preferred among these ferrites are cobalt-substituted barium and strontium ferrites.

Further, materials obtained by incorporating elements such as Co-Ti, Co-Ti-Zr, Co-Ti-Zn, Ni-Ti-Zn and Ir-Zn in the above mentioned hexagonal system ferrites can be used.

The hexagonal system ferrite is normally in the form of a hexagonal tablet. The particle diameter of the hexagonal system ferrite is represented by the width of the hexagonal tablet determined under electron microscope. In the present invention, the particle diameter of the hexagonal system ferrite is defined in the range of preferably 0.01 to 0.2 $\mu m$, particularly 0.03 to 0.1 $\mu m$.

If the particle diameter of the hexagonal system ferrite is too large, the noise level rises, and the output in a high frequency range shows a drastic drop.

If the particle diameter of the hexagonal system ferrite is too small, the saturation magnetization is reduced, lowering the output, and the dispersion of the particles is made difficult during the preparation of the magnetic coating solution.

The tabular ratio (tabular diameter/tablet thickness) of the hexagonal system ferrite is normally in the range of 3 to 20, preferably 3 to 10.

The average thickness (tabular thickness) of the finely divided particles is preferably in the range of 0.001 to 0.2 $\mu m$, particularly preferably 0.003 to 0.05 $\mu m$. The finely divided hexagonal system ferrite particles preferably have a specific surface area ($S_{BET}$) of 25 to 70 $m^2/g$ as determined by a BET method.

The saturation magnetization of the finely divided hexagonal system ferrite particles is preferably in the range of 50 emu/g or more. If the saturation magnetization falls below 50 emu/g, sufficient reproduced output cannot be obtained, disabling high density recording.

In the case of recording long wavelength signals, hexagonal system ferrites give a low output as compared with other magnetic particles. In the case of recording short wavelength signals having a recording wavelength of 1.0 $\mu m$ or less in a high frequency range, hexagonal system ferrites can be expected to give a higher output than other magnetic particles. Discoid magnetic recording media such as magnetic recording discs are required to give a uniform circumferential output without fluctuations. To this end, the in-plane orientation ratio needs to be as high as possible. When hexagonal system ferrites are used as magnetic particles, an orientation ratio as high as 0.9 or more can be realized.

Further, in the case where hexagonal system ferrites are used, when the (residual magnetization/saturation magnetization) ratio in the vertical direction, i.e., diamagnetically-corrected squareness ratio, of the magnetic layer is preferably adjusted to 0.6 or more, more preferably 0.65 or more, and the orientation ratio is adjusted to 0.9 or more, a magnetic recording disc which gives an unprecedentedly high output can be obtained. Thus, a large capacity magnetic recording disc can be provided.

The nonmagnetic layer in the magnetic recording medium of the present invention is a layer mainly comprising nonmagnetic particles and a binder resin. Part of the nonmagnetic particles are preferably electrically conductive particles such as carbon black and graphite.

From the standpoint of antistatic effect on the magnetic recording disc of the present invention, the proportion of electrically conductive particles in the nonmagnetic particles in the nonmagnetic layer is in the range of generally 1% by weight or more, preferably 2% by weight or more, more preferably 3 to 20% by weight or more.

As the electrically conductive particles to be incorporated in the nonmagnetic layer, carbon black may preferably be used. Among carbon blacks, those having a small particle diameter of 40 m$\mu$ or less and a large DBP oil absorption amount of 300 ml/10 g or more are used to smooth the surface of the magnetic layer formed on the nonmagnetic layer, reduce the spacing loss with the recording/reproducing head and, hence, provide a high reproduced output. These carbon blacks can easily form a structure in the nonmagnetic layer, resulting in a reduced surface electric resistance that eliminates dropout in running.

As carbon black to be incorporated in the nonmagnetic particles in the nonmagnetic layer, there can be used furnace black for rubber, thermal black for rubber, carbon black for color, acetylene black, lamp black, etc.

In particular, 3 to 20% by weight of the nonmagnetic particles in the nonmagnetic layer is preferably carbon black having an average particle diameter of 40 m$\mu$m or less and DBP oil absorption amount of 300 ml/100 g or more. DBP oil absorption amount of carbon black is defined as the accumulation of the amount (ml) of dibutyl phthalate which has been gradually added to and kneaded with carbon black powder until the dispersion of carbon black is found to contain one mass. More preferably, the content of such black carbon is in the range of 8 to 19% by weight. If the content of such black carbon falls below 3% by weight, the intrinsic surface resistivity of the nonmagnetic particles cannot be sufficiently reduced. On the contrary, if the content of such black carbon exceeds 20% by weight, the intrinsic surface resistivity of the nonmagnetic particles can be sufficiently reduced, but the magnetic layer cannot be provided with sufficient smoothness. The specific surface area of the nonmagnetic particles is preferably in the range of 5 to 1,500 m$^2$/g, more preferably 700 to 1,400 m$^2$/g.

Specific examples of carbon black to be incorporated in the nonmagnetic layer include #3950B produced by Mitsubishi Chemical Corporation, and Ketjen Black EC, Ketjen Black ECDJ-500 and Ketjen Black ECDJ-600 produced by Lion Agzo Co., Ltd.

These carbon blacks may be surface-treated with a dispersant, grafted with a resin or partially graphtized before use.

These carbon blacks may be added to the non-magnetic coating in the form of dispersion in a binder.

For carbon blacks which can be incorporated in the nonmagnetic layer in the magnetic recording medium of the present invention, reference can be made to *Handbook of Carbon Black,* published by Carbon Black Kyokai.

These electrically conductive particles, i.e., carbon black and the above mentioned nonmagnetic particles may be added to a dispersion in the form of dispersion in a binder.

Nonmagnetic particles other than the above mentioned electrically conductive particles to be used in the nonmagnetic layer in the magnetic recording medium of the present invention are not specifically limited. Specifically, $\alpha$-alumina having an alpha conversion of 90% or more, $\beta$-alumina, $\gamma$-alumina, silicon carbide, chromium oxide, cerium oxide, $\alpha$-iron oxide, corundum, silicon nitride, titanium carbide, titanium oxide, silicon dioxide, boron nitride, zinc oxide, calcium carbonate, calcium sulfate, barium sulfate, etc. may be used singly or in combination. The particle size of these nonmagnetic particles is preferably in the range of 0.01 to 2 $\mu$m. If necessary, nonmagnetic particles having different particle sizes can be used in combination or nonmagnetic particles having a single particle size but with a wide distribution can be used to provide similar effects.

The tap density of these nonmagnetic particles is preferably in the range of 0.3 to 2 g/ml. The water content of these nonmagnetic particles is preferably in the range of 0.1 to 5%. The pH value of these nonmagnetic particles is preferably in the range of 2 to 11. The specific surface area of these nonmagnetic particles is preferably in the range of 1 to 30 m$^2$/g. The nonmagnetic particles to be used in the present invention may be in the crystal form of acicular, spherical or die-like shapes. Specific examples of nonmagnetic particles to be used in the present invention include AKP-20, AKP-30, AKP-50 and HIT-50 produced by Sumitomo Chemical Co., Ltd., G5, G7 and S-1 produced by The Nippon Chemical Industrial Co., Ltd., and TF-100, TF-120 and TF-140 produced by Toda Kogyo Co., Ltd.

Also, by incorporating carbon black or the like in the magnetic layer, the intrinsic surface resistibility of the magnetic layer can be reduced, further inhibiting the electrification of the magnetic recording medium of the present invention and improving the running durability thereof.

The nonmagnetic layer in the magnetic recording medium of the present invention also may comprise a lubricant.

In particular, by incorporating an aliphatic acid ester as a lubricant in the nonmagnetic layer in an amount of preferably 3 to 20% by weight (more preferably 5 to 15% by weight, most preferably 8 to 12% by weight), the problem that the reduction in the thickness of the magnetic layer limits the content of lubricant in the magnetic layer can be solved. In other words, as the magnetic layer makes sliding contact with the recording/reproducing head, the lubricant is gradually consumed and runs short, causing the scratching of the magnetic layer or adding to the friction of the magnetic layer with the recording/reproducing head, eventually causing the interruption of operation. However, when a lubricant migrates from the nonmagnetic layer to the magnetic layer, the consumption of the lubricant in the magnetic layer can always be made up.

By incorporating a lubricant in the nonmagnetic layer, the problem with respect to the extremely thin magnetic layer limiting the retention of the lubricant therein can be solved.

As such a lubricant, there can be used any of various known liquid lubricants. Particularly preferred among these liquid lubricants are aliphatic acid esters. A preferred example of the aliphatic ester to be incorporated in the nonmagnetic layer is an aliphatic ester made of a monobasic aliphatic acid having 12 to 20 carbon atoms and a monovalent alcohol having 3 to 20 carbon atoms.

Examples of alcohols as starting materials for aliphatic esters include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and s-butyl alcohol, and polyvalent alcohols such as ethylene glycol, diethylene glycol, neopentyl glycol, glycerin and sorbitan derivative.

Examples of aliphatic acids as starting materials for the aliphatic acid ester include aliphatic acids such as acetic acid, propionic acid, octanic acid, 2-ethylhexanic acid, lauric acid, myristic acid, stearic acid, palmitic acid, behenic acid, arachic acid, oleic acid, linoleic acid, linolenic acid, elaidic acid and palmitoleic acid, and mixtures thereof.

Preferred examples of aliphatic esters include butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixture of butyl stearate and butyl palmitate, butoxyethyl stearate, 2-butoxy-1-propyl stearate, ester obtained by acylating dipropylene glycol monobutyl ether with stearic acid, diethylene glycol dipalmitate, diol obtained by acylating hexamethylenediol with myrisic acid, and glycerin oleate.

In order to reduce the hydrolysis of aliphatic acid esters which often occurs when magnetic recording media are used under high humidity, the isomerism (cis/trans) and branch position (branch/straight chain) of aliphatic acids and alcohols as starting materials may be properly selected.

Further preferred among these aliphatic esters is either butyl stearate or s-butyl stearate, or butoxy ethyl stearate or 2-butoxy-1-propyl stearate. Such a lubricant is advantageous in that it has a proper molecular amount so as to easily move in the layer, exerting a high replenishment effect, as well as to resist evaporation.

Such an aliphatic ester may be incorporated in the nonmagnetic powder to be contained in the nonmagnetic layer in an amount of generally 3 to 20 parts by weight, preferably 5 to 15 parts by weight, based on 100 parts by weight of nonmagnetic powder. If the content of the aliphatic acid ester falls below 3 parts by weight, a sufficient effect cannot be obtained. On the contrary, if the content of the aliphatic acid ester exceeds 20 parts by weight, the effect of replenishing the magnetic layer is too great, giving excess lubricant to the surface of the magnetic layer. This makes the magnetic layer stickable by the recording/reproducing head during running as well as reduces the adhesion between the magnetic layer and the nonmagnetic layer.

If electrically conductive particles such as carbon black are to be incorporated in the magnetic layer in the magnetic recording medium of the present invention, their added amount cannot be so great as that for the nonmagnetic layer from the standpoint of maintenance of magnetic properties. The optimum added amount of these electrically conductive particles should be limited to not more than 10 parts by weight based on 100 parts by weight of magnetic particles.

In the magnetic layer, carbon black serves to inhibit the electrification of the magnetic layer, reduce the coefficient of friction of the magnetic layer with the magnetic head, give light shielding effect and improve film strength. Different carbon blacks have different effects. Accordingly, it goes without saying that the kind, amount and combination of these carbon blacks can be properly altered from the lower to upper layer depending on the desired properties such as particle size, oil absorption amount, electrical conductivity and pH. For example, carbon black having a high electrical conductivity can be used in the lower layer to inhibit the electrification of the magnetic layer while carbon black having a large particle diameter can be used in the upper layer to reduce the coefficient of friction of the magnetic layer with the magnetic head.

Examples of solvents having a boiling point of 90° C. or higher to be used in the nonmagnetic layer coating solution of the present invention include ketones such as cyclohexanone (b.p. 156° C.), methyl isobutyl ketone (b.p. 116° C.) and diisobutyl ketone (b.p. 168° C.); isophorone (b.p. 215° C.); alcohols such as butanol (b.p. 118° C.) and isobutyl alcohol (b.p. 108° C.), and 2-methylcyclohexanol (b.p. 173° C.). As the solvent to be used in the nonmagnetic layer coating solution, there may be preferably used one having a good compatibility with the binder resin and lubricant to be incorporated in the nonmagnetic layer, such as cyclohexanone.

The boiling point of the solvent used for the magnetic layer coating solution to be coated on the nonmagnetic layer is lower than that of the solvent used for the nonmagnetic layer coating solution. For example, methyl ethyl ketone (b.p. 79° C.), THF (b.p. 66° C.), acetone (b.p. 56° C.), propanol (b.p. 97° C.), methyl acetate (b.p. 58° C.), benzene (b.p. 80° C.), methylene chloride (b.p. 40° C.), hexane (b.p. 69° C.), carbon tetrachloride (b.p. 77° C.), etc. can be used.

Also as the solvent to be used for the magnetic layer coating solution, there may be preferably used single or in combination with solvents having a good compatibility with organic compounds to be incorporated in the magnetic layer such as a binder resin and lubricant.

In this case, the boiling point of the solvent to be used for the nonmagnetic layer coating solution or the magnetic layer coating solution is determined by the boiling point hypothetically calculated from the weight proportion of solvents.

The orientation ratio of magnetic particles in the magnetic layer in the magnetic recording medium of the present invention to be used as a magnetic recording disc is generally in the range of 0.85 or more, preferably 0.90 or more, more preferably 0.95 or more. The orientation ratio is obtained by dividing the minimum circumferential squareness ratio by the maximum circumferential squareness ratio on the disc medium. The greater the orientation ratio is, the less are the fluctuations in the circumferential output and the better is the performance of the magnetic recording disc.

In order to adjust the orientation ratio to 0.85 or more, a random orientation method with a permanent magnet (as disclosed in JP-B-3-41895) or a method which comprises application of an alternating magnetic field as disclosed in JP-A-63-148417, JP-A-1-300427 and JP-A-1-300428 may be employed while the upper magnetic layer is wet.

In this case, the acicular ratio of the ferromagnetic metallic particles is in the range of generally 12 or less, preferably 10 or less to adjust the orientation ratio to 0.85 or more.

As the binder resin to be incorporated in the magnetic layer and the nonmagnetic layer in the magnetic recording disc of the present invention, there can be used known thermoplastic resins, thermosetting resins, reactive resins or mixture thereof. As the thermoplastic resins, there can be used those having a glass transition temperature of 100° C. to 150° C., a number-average molecular weight of generally 1,000 to 200,000, preferably 10,000 to 100,000, and a polymerization degree of about 50 to 1,000.

Examples of such thermoplastic resins include polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins.

Examples of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate.

These resins are further described in *Plastic Handbook*, published by Asakura Shoten. Further, known electron radiation curing resins can be incorporated in either the upper layer or the lower layer. Examples of these resins and their preparation methods are further described in JP-A-62-256219. These resins can be used singly or in combination. Preferred examples of such a combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate.

Examples of the structure of polyurethane resins which can be used in the present invention include known structures such as polyester polyurethane, polyether polyurethane, polyether polyester polyurethane, polycarbonate polyurethane, polyester polycarbonate polyurethane and polycaprolactone polyurethane.

Of all these binders, those in which at least one polar group selected from COOM, $SO_3M$, $OSO_3M$, $P=O(OM)_2$, $O-P=(OM)_2$ (in which M is a hydrogen atom or an alkaline metal base), OH, $NR_2$, $N^+R_3$ (in which R is a hydrocarbon group), epoxy group, SH and CN has been introduced by copolymerization or addition reaction may be optionally used to obtain better dispersibility and durability. The amount of such a polar group is in the range of generally $1\times10^{-1}$ to $1\times10^{-8}$ mol/g, preferably $1\times10^{-2}$ to $1\times10^{-6}$ mol/g.

Specific examples of these binders to be used in the magnetic recording disc of the present invention include VAGH, VYHH, VMCH, VAGF, VAGD, VROH, VYES, VYNC, VMCC, XYHL, XYSG, PKHH, PKHJ, PKHC and PKFE, produced by Union Carbide; MPR-TA, MPR-TA5, MPR-TAL, MPR-TSN, MPR-TMF, MPR-TS and MPR-TM, produced by Nisshin Chemical Industries Co., Ltd.; 1000W, DX80, DX81, DX82 and DX83, produced by The Electro Chemical Industrial Co., Lt.; MR110, MR100, 400X and 110A, produced by Japanese Zeon Co., Ltd.; Nippollan N2301, N2302 and N2304, produced by Nippon Polyurethane Co., Ltd.; T-5105, T-R3080 and T-5201, Burnock D-400 and D-210-80, and Crisvon 6109 and 7209, produced by Dainippon and Chemical, Inc.; U Vylon R8200, UR8300, RV530 and RV280, produced by Toyobo Co., Ltd.; Daipleramine 4020, 5020, 5100, 5300, 9020, 9022 and 7020, produced by Dainichi Seika Co., Ltd.; MX5004 produced by Mitsubishi Chemical Corporation; Sunprene SP-150, produced by Sanyo Chemical Industries Co., Ltd.; and Salan F310 and F210, produced by Asahi Chemical Industry Co., Ltd.

The content of the binder resin in the magnetic layer of the magnetic recording medium of the present invention is normally in the range of generally 5 to 50% by weight, preferably 10 to 30% by weight based on the weight of ferromagnetic particles. If a vinyl chloride resin is used, its content is preferably in the range of 5 to 30% by weight. If a polyurethane resin is used, its content is preferably in the range of 2 to 20% by weight. If a polyisocyanate is used, its content is preferably in the range of 2 to 20% by weight. These binder resins may preferably be used in combination.

In the present invention, if polyurethane is used, its glass transition temperature, breaking extension, breaking stress and yield point are preferably in the range of $-50°$ C. to 100° C., 100 to 2,000%, 0.05 to 10 kg/cm$^2$ and 0.05 to 10 kg/cm$^2$, respectively.

The magnetic recording medium of the present invention comprises at least two layers, i.e., the above mentioned magnetic layer and nonmagnetic layer. Accordingly, it goes without saying that the amount of the binder, the amount of vinyl chloride resin, polyurethane resin, polyisocyanate or other resins to be contained in the binder, the molecular weight of resins constituting the magnetic layer, the amount of polar group, or the physical properties of the above mentioned resins can be altered from the upper layer to the lower layer.

Examples of polyisocyanates which can be used in the present invention include isocyanates such as tolylenediisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; products of the reaction of these isocyanates with polyalcohols; and polyisocyanates produced by the condensation of isocyanates. Examples of the trade names of these commercially available isocyanates include Coronate L, Coronate HL, Coronate 2030, Coronate 2031, Millionate MR and Millionate MTL, produced by Nippon Polyurethane Co., Ltd.; Takenate D-102, Takenate D-110N, Takenate D-200 and Takenate D-202, produced by Takeda Chemical Industries, Co., Ltd.; and Desmodur L, Desmodur IL, Desmodur N and Desmodur HL, produced by Sumitomo Bayer Co., Ltd. These isocyanates may be used singly. Alternatively, by making the best use of the difference in hardening reactivity, two or more of these isocyanates can be used in combination in both the magnetic layer and nonmagnetic layer.

The magnetic layer in the magnetic recording medium of the present invention may comprise materials having various functions such as lubricants and abrasives. Besides these additives, an antistatic agent, dispersant, plasticizer, mildew-proofing agent, etc. can be incorporated in the magnetic layer.

As the lubricant to be incorporated in the magnetic layer, there may be used most preferably an aliphatic acid ester as in the case of the nonmagnetic layer. Specifically, the same aliphatic acid esters as can be used in the nonmagnetic layer can be used for the same reason.

In order to reduce the hydrolysis of aliphatic esters which often occurs when magnetic recording media are used under high humidity, the isomerism (cis/trans) and branch position (branch/straight chain) of aliphatic acids and alcohols as starting materials may be properly selected.

These lubricants can be used in an amount of preferably 0.2 to 20 parts by weight, more preferably 3 to 20 parts by weight, most preferably 5 to 15 parts by weight, based on 100 parts by weight of ferromagnetic particles.

Further examples of lubricants which can be used in the present invention include silicone oil, graphite, molybdenum disulfide, boron nitride, fluorinated graphite, fluorine alcohol, polyolefin, polyglycol, alkylphosphoric acid ester and tungsten disulfide.

Examples of the trade name of these lubricants to be used in the present invention include NAA-102, NAA-415, NAA-312, NAA-160, NAA-180, NAA-174, NAA-175, NAA-222, NAA- 34, NAA-35, NAA-171, NAA-122, NAA-142, NAA-160, NAA-173K, Castor oil-cured fatty acid; NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid, produced by Nippon Oils And Fats Co., Ltd.; oleic acid produced by Kanto Chemical Co., Ltd.; FAL-205 and FAL-123 produced by Takemoto Yushi Co., Ltd.; Enujerubu LO, Enujerubu IPM and Sansosizer E4030, produced by Shi Nihon Rika Co., Ltd.; TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935, produced by Shin-Etsu Chemical Co., Ltd.; Armide P, Armide C, and Armoslip CP produced by Lion Ahmer Co., Ltd.; Duomin TDO produced by Lion Fat and Oil Co., Ltd.; BA-41G produced by Nisshin Oil Mills, Co. Ltd.; and Profan 2012E, New-Pole PE61, Ionet MS-400, Ionet MO-200, Ionet DL-200, Ionet DS-300, Ionet DS-1000, and Ionet DO-200, produced by Sanyo Chemical Co., Ltd.

Specific examples of abrasives for the magnetic layer to be used in the present invention include $\alpha$-alumina having an alpha conversion of 90% or more, $\beta$-alumina, silicon carbide, chromium oxide, cerium oxide, $\alpha$-iron oxide, corundum, artificial diamond, silicon nitride, silicon carbide-titanium carbide, titanium oxide, silicon dioxide, and boron nitride. In general, known materials having a Mohs' hardness of 6 or more are used singly or in combination. A composite material made of these abrasives (abrasive surface-treated with another abrasive) may be used. These abrasives may contain compounds or elements other than the main component but exert similar effects provided the content of the main component is not less than 90%.

The particle size of these abrasives is preferably in the range of 0.01 to 2 $\mu$m. If necessary, a plurality of abrasives having different particle sizes may be used in combination or a single abrasive having a wide particle diameter distribution may be used to provide similar effects. The tap density of these abrasives is preferably in the range of 0.3 to 2 g/ml. The water content of these abrasives is preferably in the range of 0.1 to 5%. The pH value of these abrasives is preferably in the range of 2 to 11. The specific surface area of these abrasives is preferably in the range of 1 to 30 $m^2/g$. The abrasives to be used in the present invention may be in the form of acicular, spherical or die-like shapes. The abrasives to be used in the present invention may preferably have edges partially on the surface thereof to provide a high abrasion.

Specific examples of preferred abrasives include AKP-20A, KP-30, AKP-50 and HIT-50, produced by Sumitomo Chemical Co., Ltd., G5, G7, and S-1, produced by The Nippon Chemical Industrial Co., Ltd., and 100ED and 140ED, produced by Toda Kogyo Co., Ltd.

These abrasives may be incorporated in the magnetic coating in the form of a binder dispersion. The number of abrasive particles present on the surface and edge face of the magnetic layer in the magnetic recording medium of the present invention is preferably 5 or more per 100 $\mu m^2$ of the surface.

The amount of abrasives to be incorporated in the magnetic layer is normally in the range of 3 to 20 parts by weight based on 100 parts by weight of ferromagnetic particles.

If the added amount of abrasives is too small, the running durability of the magnetic recording disc is not sufficient. On the contrary, if the added amount of abrasives is too large, it disadvantageously causes a drop in the output.

The above mentioned additives to be incorporated in the magnetic layer are not necessarily 100% pure and may contain impurities such as isomers, unreacted matters, side reaction products, decomposition products and oxides besides main components. The content of these impurities is preferably in the range of 30% or less, more preferably 10% or less.

The additives to be used in the present invention may be entirely or partially added to the system at any steps during the preparation of the magnetic coating solution. For example, these additives may be mixed with magnetic materials before kneading. Further, these additives may be added to the system at the step of kneading magnetic materials with a binder and a solvent. Alternatively, these additives may be added to the system during or after the dispersion step or immediately before the coating step.

As the nonmagnetic support to be used in the present invention there can be used any known film such as polyester, e.g., polyethylene terepthalate and polyethylene naphthalate, polyolefin, cellulose triacetate, polycarbonate, polyamide, polyimide, polyamide imide, and polysulfone. These support materials may be previously subjected to corona-discharge treatment, plasma treatment, adhesion treatment, heating treatment, dust removing treatment, etc.

The thickness of the nonmagnetic support in the magnetic recording disc of the present invention is normally in the range of 1 to 100 μm, preferably 20 to 85 μm.

An undercoating layer made of a polyester resin or the like may be provided interposed between the nonmagnetic support and the nonmagnetic layer coated thereon for the purpose of enhancing the adhesion therebetween. The thickness of the undercoating layer is normally in the range of 0.01 to 2 μm, preferably 0.05 to 0.5 μm.

The nonmagnetic layer and magnetic layer of the present invention may be provided on one or both sides of the nonmagnetic support.

In order to effectively accomplish the objects of the present invention, the nonmagnetic support to be used preferably exhibits a surface roughness of generally 0.03 μm or less, more preferably 0.02 μm or less, most preferably 0.01 μm or less as calculated in terms of center-line average roughness (Ra) (cutoff value: 0.25 mm) according to JIS B 0601. Further preferably, these nonmagnetic supports not only have a small center-line average surface roughness but also are free of coarse protrusions having a size of 1 μm or more. The roughness of the surface of these non-magnetic supports can be freely controlled by the size and amount of fillers which are optionally added thereto. Examples of such fillers include oxides and carbonates of Ca, Si and Ti, and finely divided powder of acrylic organic resins. The nonmagnetic support to be used in the present invention preferably exhibits F-5 (i.e., the load at the 5% elongation) values of 5 to 50 kg/mm$^2$ in the web running direction and 3 to 30 kg/mm$^2$ in the web width direction. In general, F-5 value in the web lengthwise direction is higher than F-5 value in the web width direction. However, if the crosswise strength of the nonmagnetic support needs to be high, the present invention is not limited to this specification.

The nonmagnetic support preferably exhibits a lengthwise and crosswise heat shrinkage of 3% or less, more preferably 1.5% or less at 100° C. for 30 minutes and 1% or less, more preferably 0.5% or less at 80° C. for 30 minutes. The breaking strength of the support is preferably in the range of 5 to 100 kg/mm$^2$ in both directions. The elastic modulus of the support is preferably in the range of 100 to 2,000 kg/mm$^2$ in both directions.

The process for the preparation of the magnetic coating for the magnetic layer in the magnetic recording medium of the present invention generally comprises at least the kneading step, dispersion step, and mixing step which is optionally provided before or after these steps. These steps each may consist of two or more stages. The raw materials to be used in the present invention, e.g., magnetic material particles, binder resin, nonmagnetic particles, carbon black, abrasive, antistatic agent, lubricant and solvent may be added to the system at any stage in any step. These raw materials each may be batchwise added to the system at two or more steps. For example, polyurethane may be batchwise charged in the system at the kneading step, dispersion step or a mixing step for the viscosity adjustment after dispersion.

In order to accomplish the objects of the present invention, a known preparation technique can, of course, be used. In the kneading step, an apparatus having a strong kneading power such as continuous kneader and pressure kneader can be used to enhance the residual magnetic flux density (Br) of the magnetic recording disc of the present invention. If a continuous kneader or pressure kneader is used, the magnetic particles are kneaded with the whole or part (preferably 30% by weight or more of the total weight of all binder resins) in an amount of 15 to 500 parts by weight based on 100 parts by weight of magnetic particles. These kneading techniques are further described in JP-A-1-106388 and JP-A-1-79274. In the present invention, a simultaneous multi-layer coating method as disclosed in JP-A-62-212933 can be used to give a higher efficiency in the preparation of the magnetic recording medium.

As calendar roll to be used in the pressure molding treatment for smoothening the surface of the magnetic layer, there can be used a roll made of a heat-resistant plastic such as epoxy, polyimide, polyamide and polyimideamide. Metallic rolls may be used for pressure molding therebetween. The pressure molding temperature is preferably 70° C. or higher, more preferably 80° C. or higher. The linear pressure is preferably 200 kg/cm, more preferably 300 kg/cm or more.

The surface resistivity of the magnetic layer in the magnetic recording medium of the present invention is preferably in the range of $1 \times 10^5$ to $5 \times 10^9$ Ω/sq. The magnetic layer preferably exhibits an elasticity of 100 to 2,000 kg/mm$^2$ at 0.5% elongation in both web coating direction and crosswise direction. The breaking strength of the magnetic layer is preferably in the range of 1 to 30 kg/cm$^2$. The elasticity of the magnetic recording medium is preferably in the range of 100 to 1,500 kg/mm$^2$ in both web coating direction and crosswise direction. The residual elongation of the magnetic recording medium is preferably in the range of 0.5% or less. The heat shrinkage of the magnetic recording medium at all temperatures lower than 100° C. is preferably 1% or less, more preferably 0.5% or less, most preferably 0.1% or less.

amount of the residual solvent in the magnetic layer is preferably in the range of 100 mg/m$^2$ or less, more preferably 10 mg/m$^2$. The residual solvent in the magnetic layer is less than that in the nonmagnetic layer.

The magnetic recording medium of the present invention preferably has voids of 30% by volume or less, more preferably 10% by volume or less in both the magnetic layer and nonmagnetic layer. The voids of the nonmagnetic layer are preferably greater than that of the magnetic layer. However, if the voids of the nonmagnetic layer are not less than 5%, the voids of the nonmagnetic layer may be smaller than that of the magnetic layer.

The magnetic recording medium of the present invention comprises a nonmagnetic layer and a magnetic layer. It can easily be presumed that the physical properties of the magnetic recording medium may be altered from the nonmagnetic layer to the magnetic layer. For example, the elasticity of the magnetic layer can be enhanced to improve the running durability thereof while the elasticity of the nonmagnetic layer can be lower than that of the magnetic layer to improve the contact of the magnetic recording medium with the head.

The use of the magnetic recording medium of the present invention enables a high density magnetic recording. In particular, the magnetic recording medium of the present invention is advantageous in that the overwritability essential for digital data recording media for use in storage and reading of computer data is not deteriorated and the running durability is not reduced even in the case of high density recording with the shortest recording wavelength of 1.5 μm or less.

These advantages are created by the above mentioned configuration of the magnetic recording medium of the present invention and its preparation method. These advantage are particularly attributed to the configuration and coating method of the layers formed on the nonmagnetic support.

Further, the use of the magnetic recording disc of the present invention enables magnetic recording with little signal crosstalk and an excellent peak shift separatability not only if the recording wavelength is small but also if the track density is high. Accordingly, recording and reproduction can be performed with an excellent overwritability and running durability even under conditions of recording track width of 50 μm or less and track density of 14 track/mm or more.

The present invention will be further described in the following examples, but the present invention should not be construed as being limited thereto.

EXAMPLE I

Formulation of the Nonmagnetic Layer Coating Solution

| | |
|---|---|
| Nonmagnetic particles | 80 parts by weight |
| Titanium oxide (TiO$_2$) ("TY50" produced by Ishihara Sangyo Kaisha Ltd.; average particle diameter: 0.34 μm; specific surface area by BET method: 5.9 m$^2$/g; pH: 5.9) | |
| Carbon black (average primary particle diameter: 16 mμm; DBP oil absorption amount: 80 ml/100 g; pH: 8.0; specific surface area by BET method: 250 m$^2$/g; volatile matter: 1.5% by weight) | 20 parts by weight |
| Binder resin | |
| Vinyl chloride-vinyl acetate-vinylalcohol copolymer (content of polar group —N(CH$_3$)$_3$$^+$Cl$^-$: 5 × 10$^{-6}$ eq/g; monomer composition ratio: 86:13:1; polymerization degree: 400) | 15 parts by weight |
| Polyester polyurethane resin (neopentyl glycol/caprolactone polyol/MDI: 0.9/2.6/1; content of —SO$_3$Na group: 1 × 10$^{-4}$ eq/g) | 5 parts by weight |
| Additive | |
| sec-Butyl stearate | 4 parts by weight |
| Butoxy ethyl stearate | 2 parts by weight |
| Butoxy ethyl palmitate | 2 parts by weight |
| Oleic acid | 1 part by weight |
| Solvent | |
| Cyclohexane | 400 parts by weight |

Magnetic Layer Coating Solution

| | |
|---|---|
| Ferromagnetic particles (composition ratio: Fe/Ni = 96/4 (atomic ratio); coercive force: 1,620 Oe; specific surface area by BET method: 50 m$^2$/g; crystallite size: 195 Å; particle size (average length in the long axis): 0.20 μm; acicular ratio: 10; saturation magnetization (σs): 130 emu/g) | 100 parts by weight |
| Binder resin | |
| Vinyl chloride copolymer | 14 parts by weight |

| | |
|---|---|
| (content of —SO$_3$Na group: 1 × 10$^{-4}$ eq/g; polymerization degree: 300) | |
| Polyester polyurethane resin (neopentyl glycol/caprolactone polyol/MDI: 0.9/2.6/1; content of —SO$_3$Na group: 1 × 10$^{-4}$ eq/g) | 5 parts by weight |
| α-Alumina (average particle size: 0.3 μm) | 2 parts by weight |
| Carbon black (particle size: 0.10 μm) | 0.5 parts by weight |
| Isohexadecyl stearate | 6 parts by weight |
| Oleic acid | 1 part by weight |
| Methyl ethyl ketone | 300 parts by weight |

The particle size and crystallite size of the ferromagnetic particles were measured as follows:

Particle diameter of magnetic material: Average length in the long axis of particle was determined under a transmission electron microscope.

Crystalline size: X-ray diffractometry was used to determine the spread of half value width of diffraction line on (4,4,0) plane and (2,2,0) plane of ferromagnetic particles.

The above mentioned nonmagnetic layer coating solution and magnetic layer coating solution compositions were each kneaded by means of a continuous kneader. These materials were each subjected to kneading and dispersion by means of a sand mill. To the dispersion for the nonmagnetic layer and the dispersion for the magnetic layer was added polyisocyanate (Coronate L, produced by Nippon Polyurethane Co., Ltd.) in an amount of 10 parts by weight and 12 parts by weight, respectively. To these dispersions was each added butyl acetate in an amount of 40 parts by weight with stirring and kneading. These dispersions were each filtered out through a filter with an average pore diameter of 1 μm to prepare a nonmagnetic layer coating solution and a magnetic layer coating solution.

Onto a 62-μm thick polyethylene terephthalate support having a center-line average surface roughness (Ra) (cutoff value: 0.25 mm) according to JIS B 0601 of 0.01 μm which comprises a 0.1-μm thick undercoating layer made of a polyester polymer to enhance the adhesion thereon was coated the above mentioned nonmagnetic layer coating solution and the magnetic layer coating solution by a wet simultaneous multi-layer coating method at a coating rate of 150 m per minute in such an amount that the dry thickness of the nonmagnetic layer reached 2 μm and the dry thickness of the magnetic layer reached 0.5 μm.

While these layers were wet, the material was passed through two alternating magnetic field generators so that the magnetic particles were subjected to random orientation.

The frequency and strength of the two alternating magnetic fields used were 50 Hz and 200 Oe and 120 Hz and 130 Oe towards the downstream. After the material was dry, the material was then subjected to treatment by a 7-stage calendering machine (linear pressure: 300 kg/cm; temperature: 90° C.). The material was then punched to a 3.5 inch size piece. The material was then subjected to varnishing with an abrasive tape. From this material, a 3.5-inch floppy disc was prepared using predetermined mechanical parts.

Another magnetic layer was formed on the other side of the nonmagnetic material under the same conditions to prepare a magnetic recording disc comprising a magnetic layer coated on both sides of a nonmagnetic support.

EXAMPLE 2

A 3.5-inch floppy disc specimen was prepared in the same manner as in Example 1 except that the solvent to be used for the nonmagnetic layer coating solution was changed from cyclohexanone in an amount of 400 parts by weight to a mixture of 300 parts by weight of cyclohexanone and 100 parts by weight of diisobutyl ketone.

EXAMPLE 3

A 3.5-inch floppy disc specimen was prepared in the same manner as in Example 1 except that $TiO_2$ to be used as nonmagnetic particles in the nonmagnetic layer was replaced by a $\alpha Fe_2O_3$ ("TF-100" produced by Toda Kogyo Co., Ltd.; average particle diameter: 0.34 $\mu$m; specific surface area by BET method: 112 m$^2$/g; pH: 5.6) and carbon black was replaced by Ketjen Black EC (average particle diameter: 20 to 30 m$\mu$; DBP oil absorption amount: 340 ml/100 g; specific surface area by BET method: 950 m$^2$/g) in an amount of 8 parts by weight.

EXAMPLE 4

A 3.5-inch floppy disc specimen was prepared in the same manner as in Example 1 except that the orientation of the ferromagnetic particles was carried out by changing at a frequency from 55 Hz to 45 Hz and further a coating rate from 150 m per minute to 100 m per minute.

COMPARATIVE EXAMPLE 1

A 3.5-inch floppy disc specimen was prepared in the same manner as in Example 1 except that cyclohexanone to be used as the solvent for the nonmagnetic layer coating solution was changed to methyl ethyl ketone and methyl ethyl ketone to be used as the solvent for the magnetic layer coating solution was changed to cyclohexanone.

COMPARATIVE EXAMPLE 2

A 3.5-inch floppy disc specimen was prepared in the same manner as in Example 1 except that the thickness of the magnetic layer was 0.9 $\mu$m.

COMPARATIVE EXAMPLE 3

A 3.5-inch floppy disc specimen was prepared in the same manner as in Example 1 except that the orientation of the ferromagnetic particles was carried out by operating only the alternating magnetic field generator installed downstream with the installed upstream turned off under the conditions of 120 Hz and 130 Oe.

COMPARATIVE EXAMPLE 4

A 3.5-inch floppy disc specimen was prepared in the same manner as in Example 1 except that no nonmagnetic layer was formed.

COMPARATIVE EXAMPLE 5

A 3.5-inch floppy disc specimen was prepared in the same manner as in Example 1 except that the nonmagnetic layer coating solution was coated on the nonmagnetic support, and then dried to form thereon a nonmagnetic layer which was then wound on a winding roll, and thereafter the magnetic layer coating solution was coated on the nonmagnetic layer and then dried to form a magnetic layer.

EXAMPLE 5

A 3.5-inch floppy disc specimen was prepared in the same manner as in Example 4 except that the ferromagnetic particles to be used for the magnetic layer were changed to the following material:
Ferromagnetic particles
(Ferromagnetic hexagonal system barium ferrite powder (tabular particles))
Coercive force: 1,290 Oe
Specific surface area by BET method: 30 m$^2$/g
Particle size (tabular diameter): 0.2 $\mu$m (tabular ratio: 3.0)
Saturation magnetization ($\sigma s$): 50 emu/g

Evaluation of Properties

The floppy disc specimens thus obtained were measured for the following various properties:

Thickness of Magnetic Layer

A section was prepared from the floppy disc specimen. The section was then photographed under a scanning electron microscope ("S-700" produced by Hitachi, The thickness of the magnetic layer was determined from the photograph.

Center-Line Average Surface Roughness

The center-line surface roughness was determined by means of a three-dimensional surface roughness meter (produced by Kosaka Laboratory Co., Ltd.) at cutoff value of 0.25 mm.

Reproduced Output

Using a disc tester "SK606B" produced by Tokyo Engineering Co., Ltd. and a metal-in-gap head having a gap length of 0.45 $\mu$m, recording was each performed at a recording frequency of 625 Hz at the radial position of 24.6 mm from the center. The output reproduced by the head amplifier was measured by an oscilloscope 7633 produced by Techtronix Co., Ltd.

For the specimens comprising ferromagnetic powder as ferromagnetic particles in the magnetic layer, the reproduced output is represented relative to that of the specimen of Example 1 as 100. For the specimen comprising hexagonal system ferrite as ferromagnetic particles in the magnetic layer and the specimen of Comparative Example 4, the reproduced output is represented relative to that of the specimen of Example 2 as 100.

Overwritability

Using the above mentioned tester, a signal of 312.5 KHz was recorded on a specimen which had been demagnetized by an alternating (current) magnetic field at the radial position of 39.5 mm from the center. The output 01 (dB) of 312.5 KHz component was measured by means of a spectrum analyzer "TR4171" produced by Advantest. A signal of 1 MHz was immediately overwritten on the same position. From the output 02 (dB) of 312.KHz component measured at the same position, the overwritability 02-01 (dB) was determined.

Running Durability

Using a floppy disc drive "FD1331" produced by Nippon Electrical Co., Ltd., recording was made on all 240 tracks on the specimen at a recording frequency of 625 KHz. A thermal cycle test was then effected at the radial position of 37.25 mm from the center in accordance with the following thermal cycle flow.

Under the thermal conditions, the running condition at the 12 millionth pass was observed for the evaluation of running durability.

Thermal Cycle Flow (25° C.-50% RH; 1 hour)→heating for 2 hours→(60° C.-20% RH; 7 hours)→cooling for 2 hours→(25° C.-50% RH; 1 hour)→cooling for 2 hours→(5° C.-50% RH; 7 hours)→heating for 2 hours→(25° C.-50% RH; 1 hour)

Every 500,000th pass, the output of all the tracks and dropout were measured. When the output reached 45% or less of the initial value, it was recognized as dropout.

The results of the properties of the 3.5-inch floppy disc specimens are set forth in Table 1.

TABLE 1

| Specimen No. | Surface roughness Ra (μm) | Reproduced (%) | Durability (unit: × 10,000 pass) | Overwritability (dB) |
|---|---|---|---|---|
| Example 1 | 6.7 | 100 | 1,000 or more | −37 |
| Example 2 | 7.0 | 98 | 1,000 or more | −33 |
| Example 3 | 7.5 | 97 | 1,000 or more | −32 |
| Example 4 | 7.4 | 98 | 1,000 or more | −33 |
| Comparative Example 1 | 11.0 | 80 | 1,000 or more | −30 |
| Comparative Example 2 | 7.0 | 110 | 1,000 or more | −20 |
| Comparative Example 3 | 8.5 | 86 | 1,000 or more | −30 |
| Comparative Example 4 | 12.0 | 100 | Dropout at 50 | −33 |
| Comparative Example 5 | 11.0 | 97 | Dropout at 450 | −31 |
| Example 5 | 7.0 | 100 | 1,000 or more | −37 |

In accordance with the present invention, a magnetic recording medium suitable for magnetic recording discs having a magnetic layer with excellent surface properties, a large recording capacity, and which exhibits excellent electromagnetic characteristics and running durability, particularly an excellent overwritability upon high density recording, can be obtained by coating a nonmagnetic layer coating solution on a nonmagnetic support, and then coating a magnetic layer coating solution thereon while the nonmagnetic coating layer is wet to prepare a magnetic recording medium comprising a nonmagnetic layer and a magnetic layer formed in this order thereon, wherein the thickness of the magnetic layer is in the range of 0.8 μm or less. A process for the preparation of such a magnetic recording medium is also provided.

While the invention has been described in detail and with reference to specific embodiments thereof, it will be apparent to one skilled in the art that various changes and modifications can be made therein without departing from the spirit and scope thereof.

What is claimed is:

1. A process for preparing a magnetic recording medium, which comprises the steps of:
    (a) coating a nonmagnetic layer coating solution comprising nonmagnetic particles dispersed in a binder resin solution on a nonmagnetic support to form a nonmagnetic coating layer,
    (b) coating a magnetic layer coating solution comprising ferromagnetic particles dispersed in a binder resin solution on said nonmagnetic coating layer while said nonmagnetic coating layer is wet, and
    (c) drying to form a nonmagnetic layer and a magnetic layer on said nonmagnetic support;

wherein the boiling point of the solvent used for said nonmagnetic layer coating solution is higher than the boiling point of the solvent used in said magnetic layer coating solution.

2. A process as in claim 1, wherein the boiling point of the solvent used in said nonmagnetic layer coating solution is 40° C. higher than the boiling point of the solvent used in said magnetic layer coating solution.

3. A process as in claim 2, wherein the boiling point of the solvent used in the nonmagnetic layer coating solution is 90° C. or higher and the boiling point of the solvent used in the magnetic layer coating solution is 100° C. or lower.

4. A process as in claim 3, wherein said ferromagnetic particles comprise a ferromagnetic metal powder or a hexagonal system ferrite.

5. A process as in claim 3, wherein at least part of said nonmagnetic particles to be contained in said nonmagnetic layer are electrically conductive particles.

6. A process as in claim 2, wherein said ferromagnetic particles comprise a ferromagnetic metal powder or a hexagonal system ferrite.

7. A process as in claim 2, wherein at least part of said nonmagnetic particles to be contained in said nonmagnetic layer are electrically conductive particles.

8. A process as in claim 1, wherein said ferromagnetic particles comprise a ferromagnetic metal powder or a hexagonal system ferrite.

9. A process as in claim 8, wherein at least part of said nonmagnetic particles to be contained in said nonmagnetic layer are electrically conductive particles.

10. A process as in claim 1, wherein at least part of said nonmagnetic particles to be contained in said nonmagnetic layer are electrically conductive particles.

* * * * *